Patented June 9, 1942

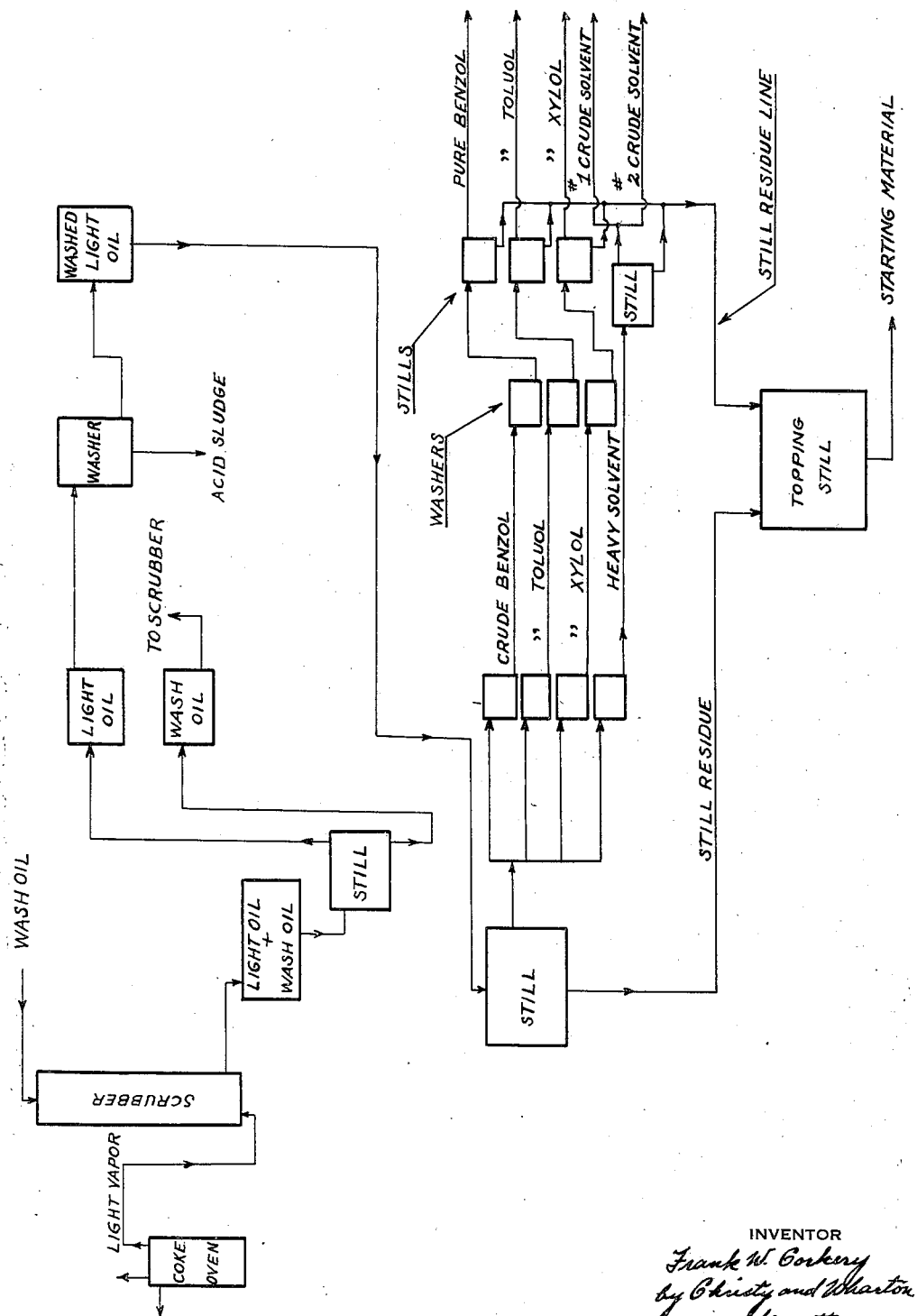

2,285,417

UNITED STATES PATENT OFFICE 2,285,417

COUMARONE-INDENE RESIN

Frank W. Corkery, Crafton, Pa., assignor to Pennsylvania Industrial Chemical Corporation, a corporation of Pennsylvania Application February 9, 1940, Serial No. 318,067

5 Claims. (Cl. 260—81)

This invention relates to the production of a coumarone-indene resin of a sort suitable for use in mastic tile.

The invention primarily rises from my discovery that the complete resin recovered from purified aromatic "still residue" which is a waste product of coal by-product recovery plants, and which is fundamentally a coumarone-indene resin, contains a strictly limited series of the coumarone and indene polymers, and that the resin may be used as a plasticizer with very high polymer coumarone-indene resin, to give a coumarone-indene blend having a melting point and penetration characteristics which render it suitable for use in binders for mastic tile.

First to discuss the still residue resin, the still residue from which it is derived is a substance residually produced in the fractionation and purification treatments of the light oil recovered in the by-product coking of coal. This light oil comes over in coal distillation. By far the greatest proportion of the light oil distills over before tar in by-product coking, and is recovered from the gases with which it comes over by being absorbed in a scrubbing oil, which scrubbing oil is usually a heavy cut of petroleum. The still residue contains polymers of resin-forming bodies in various stages of polymerization, some heavy monomers, traces of naphthalene, and sulphonate contamination.

As a still residue of this sort is commonly available commercially, it contains a substantial proportion of sulphonates from the acid purification and neutralization of the light oil, or light oil fractions, followed by the distillation in the "pure stills" which results in the production of a residue. These sulphonates are in the form of the alkaline and alkaline earth salts of sulphonates of light oil aromatics; and the alkaline and alkaline earth acid sulphonates of the light oil aromatics. Sulphate addition products and sulphones are also present in the mass of impurities. All are herein included in the general term "sulphonates."

The accompanying drawing is a diagrammatic representation, or flow sheet, showing a by-product recovery installation of the sort from which the still residue with which I am concerned is derived, and illustrates specifically the points at which the still residue is taken off.

If such distillation be conducted upon a still residue of the sort above described, which is not subjected to initial purification, the resultant solid product, or sulphonate contaminated resin, is a dark brown to blackish material, which differs definitely in important characteristics from a coumarone-indene resin which does not contain sulphonates. Its color depth is about 17 or 18 on the coal tar resin color scale. While usable for some purposes, this sulphonate-contaminated resin, obtained as the solid residuum from the distillation of unpurified still residue, has qualities which lessen its suitability for many purposes, prominent amongst which qualities is in its tendency to water-spot when included in mastic tile, and its tendency to be brittle at low temperatures.

In preparing from the still residue a resin of coumarone-indene sort purposed inter alia for use in mastic tile, I have, therefore, purified the still residue of its content of sulphonates, initially to obtain a liquid consisting preponderantly of aromatic solvent and coumarone and indene polymers in various stages of polymerization (i. e. consisting of coumarone and indene polymers containing various different numbers of the coumarone and indene units). This purification may be effected in several ways. For example, it may be effected by solvent separation, as in my United States Patent No. 2,172,437, dated September 12, 1939, or may be by treatment with sulphuric acid and water, accompanied by gentle heating, as in my co-pending application Serial No. 182,804, filed December 31, 1937.

Following removal of sulphonates, there remains initially a still residue consisting essentially of the coumarone and indene polymers in solution in the aromatic solvents with which they were associated in the starting material, and with any aromatic or aliphatic solvent or solvents, used in the purification. Such purified solution of coumarone-indene polymers is subjected to distillation to distill off solvent and to recover a yield of resin, either as a complete resin containing all the series of polymers of the still residue, or a topped resin from which part, or all the dimers of coumarone and indene are removed by distillation. These dimers distill off under steam and vacuum at a temperature of about 220° C., to leave what is essentially a solid coumarone-indene resin, having a melting point of about 95° C. to 105° C. (ball and ring), and having a molecular weight of about 450.

Since this resin is of good melting point, and is devoid of dimers, it is naturally to be assumed that it is a resin particularly suitable for use with gelled oils to provide a binder to be associated with pigment or filler in making mastic tile. It does not, however, tend to give a mastic tile in which it is included high penetration resistance at temperatures above normal room temperature and mastic tile in which it is included tends to differ rather widely in its penetration at 77° F. and its penetration at 115° F.

In seeking to improve the qualities of the resin for such use, I analyzed the polymer structure of the resin, and found that it consists almost exclusively of coumarone and indene polymers containing 3, 4, 5 and 6 units of coumarone and indene. That is, it consists almost exclusively of coumarone and indene polymers which I designate as being in the 3rd, 4th, 5th, and 6th stages of polymerization. There is an almost total absence of polymers in the 7th stage of polymerization, and there are practically no polymers in any higher stage of polymerization. At temperatures above normal room temperature the resin does not, therefore, have the benefit of a content of high polymers capable of individual resistance to penetration. I have found that the addition of higher polymers, independently obtained, to this resin renders the resin too hard and brittle for satisfactory use in mastic tile.

A molecular analysis of the purified still residue resin from which no dimers are removed, shows that it consists about 50% of dimers and about 50% of polymers containing 3, 4, 5 and 6 units of coumarone or indene; and that of this latter content the 4th and 5th stage polymers greatly preponderate. I have found that, as the still residue is commercially available, its relative proportion of dimers with the sum of the other polymers does not vary much more than 5% either way from the above-stated proportion.

I have discovered that, although high melting resin may not with satisfaction be added to a completely topped still residue resin, to the extent its initial content of dimers is retained in the resin that retained content of dimers is usable to plasticize high coumarone-indene polymers to admit of their addition to the still residue resin. Any substantial retention of dimers in the still residue resin, accompanied by a substantial addition of high melting coumarone-indene resin, is beneficial. By "beneficial" I mean causing increase in those qualities which derive from high viscosity at elevated temperature with respect to the melting point of the resin. In mastic tile, and also in wire-coatings, such desirable qualities are resistance to penetration at elevated temperature, and flow-resistance at elevated temperature.

To give a concrete example: Dimers in a weight of about 25% the initial weight of the resin were retained, and a high-melting coumarone-indene resin, such as one having a melting point from 150° C. (ball and ring) upward, was included in a weight somewhat exceeding the weight of the retained dimers. In this blended resin the resistance to penetration at elevated temperature is substantially better than that of a still residue resin from which all the dimers are distilled off.

Proceeding on this principle, I have found that the best results are obtained when the total still residue resin is blended with a high melting resin in as great a proportion of the latter as the dimer content of the still residue resin is able to plasticize. By "total" still residue resin I mean a run-of-the-still resin recovered by purifying raw still residue, and by distilling off its solvent content, but in which all, or approximately all the dimer content has been retained. Such still residue resin is obtained by discontinuing distillation soon after the first appearance of the dipolymer oil of the resin, which is composed almost exclusively of the coumarone and indene dimers.

The total still residue resin has a melting point within the approximate range of 10° C. and 20° C., and has a molecular weight within the approximate range of 300 to 350 and has a color intensity of about 10 on the paracoumarone resin color scale. Typically I blend with this total still residue resin a high melting coumarone-indene resin of a melting point from about 150° C. (ball and ring) to about 200° C. (ball and ring). Such high melting resin has an average polymer size between 15 unit polymers and 20 unit polymers, and has a molecular weight of from about 1400 to 2500. It has high resistance to penetration both at 77° F. and at 115° C. By blending such resins in the approximate proportion of 60% total still residue resin and 40% of high melting resin, an excellent coumarone-indene resin for association with plasticizers in a binder composition for mastic tile is produced.

The resin above described has a melting point of about 95° C. (ball and ring). It will be assumed that this blended resin is mixed with plasticizer, such as gelled linseed oil in the standard proportion of 70% of resin and 30% of the plasticizer to form a binder composition for mastic tile, and that mastic tile is made by mixing this binder with pigment in the standard proportion of 75% pigment to 25% binder. That tile has an indentation value of about 14 for 1 minute at 77° F., for 10 minutes at 77° F. it has an indentation value of about 18, and for 30 seconds at 115° F. it has an indentation value of about 28. A similarly proportioned mastic tile containing dimer-free still residue resin shows an indentation value of about 16 for 1 minute at 77° F., an indentation value of about 32 for 10 minutes at 77° F., and an indentation value of about 100 for 30 seconds at 115° F. These penetrations were all taken by the standard indentation machine used by manufacturers of mastic tile.

It will be seen that whereas the penetration indices of the dimer-free resin and the blended resin are fairly close to each other, under conditions favorable for resisting penetration, there is a marked difference in the penetration when continued for a substantial length of time, and a striking difference in their penetration indices at elevated temperature. The difference in penetration-resisting properties is intermediate in value if the still-residue resin retains some, but less than all, the content of dimers, and is blended with high-polymer coumarone-indene resin in appropriate quantity and of appropriate melting point. That is, when such a coumarone-indene blend is mixed in standard proportions with gelled linseed oil and the binder thus formed mixed in appropriate proportions with pigment to form mastic tile, the indentation value of the tile at 115° F. is closer to the indentation value at 77° F. than in the case of a tile made in similar proportions which contains the dimer-free still-residue resin, but is not so close as when using a blend composite of total still residue resin, and a high melting coumarone-indene resin of the maximum molecular weight and quantity consistent with the plasticizing capacity of the total still residue resin.

Further, I have found that by blending the total still residue resin with a coumarone resin having an extremely high melting point, such as a melting point of 250° C. and upward, and a molecular weight exceeding 3000 in a proportion of 80% of the total still residue resin to 20% of the extremely high melting resin, I produce a blend which may be used without the addition of gelled oil as the binder in mastic tile. This resin blend is operative for that purpose on the principle that the small proportion of extremely high polymers gives the blend resistance to penetration while the quantity of dimers introduced with the total still residue is adequate to plasticize the blend. The intermediate polymers, namely those in the 3rd, 4th, 5th, and 6th stages of polymerization, may be considered as a filler, or bulkng content, of the resin.

In all proportions of retained dimer content and added high polymer resin plasticized by the dimer content, the blended resin has a higher viscosity at elevated temperature than has a still residue resin of equal melting point, the melting point of which is dependent upon the removal of dimers rather than upon the addition of high polymer resin. In explanation the dimer-free still residue resin above noted, which consists of 3rd, 4th, 5th, and 6th stage polymers, has a melting point of about 95° C., the melting point being relatively so high because of the absence of any substantial dimer content. A still residue resin having about 25% its weight supplied by retained dimers has a melting point of about 55° C.; and when there is added to it a content of high polymer resin melting above 150° C. in a quantity equal to about 30% the weight of the still residue resin, the blend has a melting point of about 95° C. A total still residue having about 50% its weight supplied by its dimers has a melting point of about 10° C., and when this resin is mixed in the proportion of about 60% of the still residue resin to about 40% of high polymer coumarone-indene resin melting above 150° C., the melting point of the blend is about 95° C.

Whereas these three exemplary resins all have approximately the same melting point, it has been above explained wherein their penetration characteristics differ widely. The penetration characteristics of the resin and the resistance of the resin to flow at elevated temperature, are functions of the viscosity of the resin at elevated temperature, and it may be said that the blends of still residue resin with high polymer coumarone-indene resin are characterized by having a higher viscosity at elevated temperature than a still residue of equal melting point, the melting point of which is attributable to the subtraction of dimers to give a resin composed in approximate entirety of the 3rd, 4th, 5th, and 6th stage polymers.

It is not possible to state in definite proportions the proportion of high polymer resin to dimers which will render the blend containing the still residue resin satisfactory for use in mastic tile. Because the molecular weight, as well as the quantity of the high polymer resin plays a part in the apportionment, the upper limit of included high-melting resin is necessarily variable. It may, however, be stated as a guide that in blending a still residue resin, composed aside from its dimer content of 3rd, 4th, 5th and 6th stage polymers, with high polymer coumarone-indene resin having a melting point of between 150° C. and 175° C. the latter may be included within an upper limit of 4 parts by weight of the high polymer resin to 3 parts by weight of the dimer content of the still residue resin. With this as a guide, suitable apportionment may be made in each particular instance without undue trial and error. If the blend is purposed for use in newsprint ink, or as wire coating, the proportioning may be varied to give a blend of somewhat lower melting point.

It is desirable that the high-melting coumarone-indene resin blended with the still-residue resin should be of high polymer size, and that its melting point should exceed 150° C. (ball and ring). Advantage is, however, derived from blending in the high-melting resin, even though its melting point should not be so high; provided that it be of a polymer size remotely high with respect to the 6th stage polymers, which are the highest polymers present in any substantial proportion in the still residue resin. That is, advantage is to be derived from blending if the high-melting resin has an average molecular weight exceeding 1000, and that its polymer size be considered "remotely high" in the sense that it has no substantial content of polymers as low as 10th stage polymers.

Wherever, throughout the specification and claims, melting point is given without qualification as to the method used in its determination, it is to be taken for granted that it is determined by the "ball and ring" procedure. Where not specifically so stated, proportions are to be taken as based upon parts by weight. By the term "total" still residue resin I intend to specify a reasonable approximation to a complete retention of dimers, and not an absolute retention of them.

Where the term "resin" is used without qualification in the specification and claims, it is to be taken as coumarone-indene resin; and also the term "coumarone-indene" is used of a high-polymer resin without regard to the theoretical capacity or incapacity of coumarone to form polymers as high as those which indene is capable of forming.

I claim as my invention:

1. The herein described blended coumarone-indene resin composite of still residue resin derived primarily by purification and distillation of the still residue resultant from the acid purification, neutralization and distillation of the light oil derived in the by-product coking of coal consisting essentially of coumarone-indene dimers and coumarone-indene polymers in the 3rd, 4th, 5th and 6th stages of polymerization, with added high-melting coumarone-indene resin consisting of polymers in higher than the 10th stage of polymerization; in the blend the proportioning being approximately 25% to 40% dimers, 25% to 40% 3rd, 4th, 5th and 6th stage polymers and 20% to 40% added high melting resin, the melting point and proportional inclusion of the added high-melting resin within the given limits being such as to impart to the blend a melting point approximately as high as 95° C.

2. The herein described blended coumarone-indene resin composite of still residue resin derived primarily by purification and distillation of the still residue resultant from the acid purification, neutralization and distillation of the light oil derived in the by-product coking of coal consisting essentially of coumarone-indene dimers and coumarone-indene polymers in the 3rd, 4th, 5th and 6th stages of polymerization, with added coumarone-indene polymers in higher than the 10th stage of polymerization; in the blend the proportioning being approximately 25% to 40% dimers, 25% to 40% 3rd, 4th, 5th and 6th stage polymers and 20% to 40% added high coumarone-indene polymers.

3. The herein described blended coumarone-indene resin consisting essentially of still residue resin derived primarily by purification and distillation of the still residue resultant from the acid purification, neutralization and distillation of the light oil derived in the by-product coking of coal consisting essentially of coumarone-indene dimers and coumarone-indene polymers in the 3rd, 4th, 5th and 6th stages of polymerization, the said still residue resin containing coumarone-indene dimers in a quantity of about 50% the weight of the still residue resin, no more than the initial content of 3rd, 4th, 5th and 6th stage coumarone-indene polymers of the said still residue resin, and an added content of high-polymer coumarone-indene resin melting from about 150° C. upward in a quantity at least approximately equal to the weight of the coumarone-indene dimers.

4. The herein described blended coumarone-indene resin consisting essentially of still residue resin derived primarily by purification and distillation of the still residue resultant from the acid purification, neutralization and distillation of the light oil derived in the by-product coking of coal consisting essentially of coumarone-indene dimers and coumarone-indene polymers in the 3rd, 4th, 5th and 6th stages of polymerization, the said still residue resin containing coumarone-indene dimers in a quantity not substantially less than 25% the weight of the still residue resin, no more than the initial content of 3rd, 4th, 5th and 6th stage polymers of the said still residue resin, and an added content of high-polymer coumarone-indene resin melting from about 150° C. upward in a quantity at least approximately equal to the weight of the coumarone-indene dimers.

5. The herein described blended coumarone-indene resin consisting essentially of still residue resin derived primarily by purification and distillation of the still residue resultant from the acid purification, neutralization and distillation of the light oil derived in the by-product coking of coal consisting essentially of coumarone-indene dimers and coumarone-indene polymers in the 3rd, 4th, 5th and 6th stages of polymerization, the said still residue resin containing coumarone-indene dimers in a quantity not substantially less than 25% the weight of the still residue resin, no more than the initial content of 3rd, 4th, 5th and 6th stage polymers of the said still residue resin, and an added content of high-polymer coumarone-indene resin melting from about 150° C. upward in a quantity approximately as great as the coumarone-indene dimer content of the still residue is capable of plasticizing.

FRANK W. CORKERY.